United States Patent Office 3,787,566
Patented Jan. 22, 1974

3,787,566
DISINFECTING AEROSOL COMPOSITIONS
Claude Gauvreau, Laval, Quebec, Canada, assignor to Holliston Labortories, Inc., Waltham, Mass.
No Drawing. Continuation-in-part of application Ser. No. 854,009, July 29, 1969, now Patent No. 3,595,975, which is a continuation of application Ser. No. 500,225, Oct. 21, 1965, which in turn is a continuation of application Ser. No. 179,778, Mar. 14, 1962, both now abandoned. This application Mar. 29, 1971, Ser. No. 129,254
The portion of the term of the patent subsequent to July 27, 1988, has been disclaimed
Int. Cl. A01n 9/22, 9/24, 9/26
U.S. Cl. 424—45    11 Claims

ABSTRACT OF THE DISCLOSURE

Disinfecting aerosol compositions comprising pyridinium halide salts admixed with a terpene, together with a propellant in an aerosol container provide effective synergized bacteriostatic action. In particular, effective disinfecting aerosol compositions of both a residual and an air-santizing type are prepared by a sprayable composition comprising cetyl pyridinium bromide, citral and a propellant.

---

This application is a continuation-in-part of copending application U.S. Ser. No. 854,009, filed July 29, 1969, now U.S. Pat. 3,595,975, which patent is a streamlined continuation of U.S. Ser. No. 500,225, filed Oct. 21, 1965, which is a continuation of U.S. Ser. No. 179,778, filed Mar. 14, 1962, both now abandoned.

BACKGROUND OF THE INVENTION

The control of fungal growth presents a serious problem in many industries, institutions, and in medicine. In addition, control of bacteria, algae and other microscopic forms of animal and plant life is important. Means for inhibiting the growth of microorganisms have hitherto been only partly successful. While numerous substances have been shown to have antimicrobial properties, the disadvantages of many of these limit their usefulness; for example, they may be truly effective only when used in such heavy concentrations that they are uneconomical, hazardous, or toxic.

The substance phenol, also known as phenol hydrate and carbolic acid, has been one of the most widely used disinfectant substances. Because it is adsorbed by intact skin, by wound tissue, and by mucous membranes, its usefulness is limited to such dilute concentrations that its antimicrobial activity is necessarily reduced. The toxicity and adverse side effects of the substance are well recognized.

Nevertheless, phenol is a widely adopted and useful standard against which the relative potencies of other compounds are measured. Hence the term "phenol coefficient" or as abbreviated, the PC factor of the substance compared as used herein, is the unit of measure by which is indicated the relative weight of the substance in solution by comparison with the phenol concentration required to exercise the same degree of growth-inhibiting activity against a given species of microorganism under the same conditions of testing.

The antimicrobial properties of cetyl pyridinium halogen salts, per se, have been recognized heretofore, the chloride salt having been shown to be antiseptic, as by Sarber, J. Pharmacol., 74, 227, 1942. Antifungal properties of the bromide have been employed in a medication proposed by Ingmar Mansson, Medlemsblad for Sveriges Veterinarforbund, nr. 10/1959.

Citral, which is a relatively common terpene aldehyde found in the volatile oil of lemon, lemon grass, and orange, has long been known and widely used as a flavoring agent in foods and beverages. Recent findings of its bactericidal and antifungal properties are published by Zibister, D. E. in Russian publication Zh. Mikrob. Epid. i Immunobiol, 7, 15–18, 1960. The germidical efficacy of a few other aromatic oils has been indicated in papers such as that of Mose, J. R. and Lukes, G., Arzneimittel Forsch, 7, 687–92, 1957.

Phenols and many phenolic compounds cannot be effectively dispensed in an aerosol air santizer in high concentration due to the irritating effect of the phenol and phenolic compounds on plants, animals and humans, particularly in the nasal and throat passages. Accordingly, phenol is often employed in aerosol compositions in residual-type sprays; that is, aerosol or pump-type sprays dispensing relatively large particle sizes; for example, over 100 microns, which do not remain airborne for long periods of time, or if employed in air sanitizers, must be employed in combination with other ingredients to modify their effects or in low nonirritating concentrations. In addition, many quaternary ammonium compounds, such as the alkyl benzyl dimethyl ammonium chlorides, when applied in a spray form, through mist devices or aerosol or pump sprays cause an adverse reaction in humans, such as an irritating effect or feeling of dryness in the nasal and throat passages. The empolyment of aerosol or sprayable compositions is an effective means in whicn to provide a wet; that is, a residual-type spray, or an air sanitizer-type spray.

SUMMARY OF THE INVENTION

My invention relates to aerosol antiseptic and disinfecting compositions for inhibiting the growth of microorganisms, particularly fungi and bacteria. More particularly, my invention relates to foamable and sprayable disinfecting compositions comprising a propellant and including as one active constituent a halide salt of a pyridinium compound and as a second active constituent a member of the group of organic compounds all having ten carbon atoms consisting of the terpenes and their oxygenated derivatives. My aerosol composition containing said active components provides synergistic bacteriostatic action against a wide variety of microorganisms. My disinfecting composition may be effectively employed both in foam-dispensing aerosol containers as well as in air sanitizers and residual-type aerosol spray dispensers, both at high and low pressure and with a variety of valve dispensing devices and valve orifice openings. My aerosol compositions are particularly useful, since due to the synergistic coaction of the active ingredients, low concentrations of the active ingredients; for example, less than 1000 p.p.m., such as less than 325 p.p.m., may be used, considerably reducing toxicity hazards from the active ingredients and any other adverse human effects due to the ingredients in the atmosphere or in topical applications. I have found that my aerosol compositions employed in air sanitizers may be sprayed into the air, and in general, are nontoxic and are not accompanied by any immediate irritating or adverse effect on persons walking through such air-borne particles.

My compositions which are employed in aerosol containers comprise propellants, such as those propellants normally employed as aerosol propellants, a halide salt of a pyridinium compound and a terpene or an oxygenated derivative thereof, as well as other additives, either as carriers like water or alcohol or combinations thereof, or as additives to effect the desired degree of dryness or to enhance or add to the disinfectant actions of the active ingredients.

I have discovered that the halogen salts of alkyl and alkenyl-substituted pyridinium particularly the chloride iodide and the bromide salts thereof, in admixture with a member of the group of isoprenoid compounds consisting of the monocyclic, bicyclic and acyclic monoterpene hydrocarbons and their alcohols, ethers, acids, aldehydes, ketones, and other oxygenated derivatives are synergistic with each other and greatly augment and improve upon the specific anitmicrobial properties attributable to the separate constituents. Relatively dilute solutions of the salt and of the monoterpene compound, each present in a concentration of the order of a few parts per million, are efficacious as disinfectants and for inhibiting the growth of a wide range of microorganisms.

An object of my invention is to provide sprayable and foamable aerosol disinfecting products and compositions, as well as aerosol packages containing such compositions, which compositions utilize a synergizing effect manifested by admixtures of a pyridinium halide salt and a monoterpene whereby aerosol sprays, both residual and air sanitizing and foams may be realized with high antimicrobial activity at relatively low cost and having relatively low toxicity effects at the highest concentrations required for destruction of a wide range of microorganisms.

The first constituent active substance of my disinfecting composition may be chosen from the halide salts (iodide, fluoride, chloride and bromide or combinations thereof) of N-aliphatic pyridinium compounds such as the alkyl and alkenyl N-pyridinium halide salts, particularly those derived from long-chain; e.g. $C_{12}$–$C_{20}$, fatty alcohols. The preferred pyridinium halides are the chlorides and bromides, and particularly preferred compounds are cetyl and lauryl pyridinium bromide and chloride. Typical pyridinium halide salts which may be employed would include but not be limited to cetyl pyridinium bromide, cetyl pyridinium chloride, lauryl pyridinium chloride, lauryl pyridinium bromide. Typical N-substituent groups would include, but not be limited to, $C_1$–$C_{20}$ groups, saturated or unsaturated, octyl, nonyl, methyl, ethyl, butyl, propyl, cyclohexyl, decyl, dodecyl, cetyl, lauryl, stearyl, oleate, myristate, etc., and the like. The selection of the particular substituent group is often based upon the degree and nature of water solubility desired and whether the compound is to be employed with emoluments, nonionic surface-active agents and the like.

The second constituent substance of an antiseptic composition according to my invention may be chosen from among a relatively large group of organic compounds having structures containing the repeating isoprene structural pattern, which are classed as terpenes and generally designated $C_{10}H_{16}$, and their oxygenated derivatives generally designated $C_{10}H_{16}O$ and $C_{10}H_{18}O$. The class includes the terpene hydrocarbon compounds m-cymene and p-cymene, $C_{10}H_{14}$, and among the oxygenated derivatives are included the compounds numerically designated $C_{10}H_{14}O$, $C_{10}H_{14}O_2$, $C_{10}H_{20}O$, and $C_{10}H_{20}O \cdot H_2O$.

The monoterpenes have been defined succinctly in the chemical arts; see textbook "Organic Chemistry" by Fieser and Fieser, published by C. C. Heath and Company, Boston, U.S.A. Among the acyclic forms of the class are: myrcene; ocimene; the isomers of citral-neral and geranial; citronellal; nerol; geraniol; citronellol; and linalool. The monocyclic monoterpenes consist of: p-cymene; limonene; terpinolene; terpinene; phellandrene; terpinol; terpineol; menthol; thymol; piperitol; isopulegol; carvacrol; carvomethol; carveol; perillaldehyde; phellandral; menthone; pulegone; isopulegone; piperitone; carvomenthone; carvone; dihydrocarvone; carvotanacetone; diosphenol; cineole; ascaridole; m-cymene; and sylvestrene (carvestrene). Bicyclic monoterpenes consist of: thujene; sabinene; car-3-ene and car-4-ene; pinene; camphene; fenchene, thujyl alcohol; sabinol, thujone; umbellulone; carone; myrtenal; myrtenol; pinocamphone; pinocampheol; camphor; camphorquinone; borneol; fenchone; and fenchyl alcohol. Many of the foregoing compounds have stereo-isomer forms.

Compositions formulated to combine a pyridinium halide and a monoterpene organic compound are ideally suited for aerosol atmospheric or topical application in the treatment of infections by microorganisms in man and animals both on skin surfaces and on mucous membranes, when dissolved or dispersed in a suitable compatible carrier. An exceedingly large number of combinations are possible, depending on the mode of use intended, kind of vehicle in which the active ingredients are dissolved or suspended, and the nature of further additives which may be incorporated for therapeutic purposes. The ratio of concentrations of the halide salt and of the monoterpene may be varied widely, the latter preferably but not necessarily being present in somewhat greater concentration than the former. Effective ratios of the halide salt to the monoterpene, by weight, may range from about 1:3000 to about 3000:1. It will be understood that optimum ratios will lie generally intermediate the extremes of the range indicated, and the highest enhancement an antimicrobial activity will in most of the possible combinations be realized with the monoterpene present in the proportion of a small multiple of the weight of the halide salt. The weights of the active ingredients may, for example, bear a weight ratio between 1:300 and 300:1; e.g., 1:50 and 50:1. Compositions for inhibiting the growth of microorganisms may comprise from about 2 to 150 parts; e.g., 5 to 50, per million of the terpene and from 5 to about 600; e.g., 25 to 350, parts per million of a pyridinium halide. For example, in compositions particularly for vaginal or other topical use in an aerosol spray or foam, the active ingredients may comprise, for example, from 1 to 100% to about 1 to 50% by weight of a pyridinium, such as cetyl pyridinium, bromide, and from about 1/200% to about 1/100% by weight of the monoterpene, such as citral.

My active disinfectant ingredients may be placed in liquid or solid compositions, including a variety of carriers so that they may be dispensed in spray or foam form for the use of aerosol-type propellants. A variety of propellant compounds may be employed, but typically, the propellants are the liquidfied compressed gases generally used to utilize as aerosol propellants. These propellants may be broadly categorized as halocarbons, such as fluorocarbons and chlorocarbons, and low molecular weight hydrocarbons, such as butane and propane, which are liquid under container pressures which may range from 20 to 300 p.s.i.g. Compressed gases, such as carbon dioxides, the oxides of nitrogen, such as nitrous oxide, and nitrogen may also be used to dispense my compositions. Such gases are included in the term "liquified gaseous aerosol propellant" as used herein. Often, combinations of propellants are employed to obtain the proper degree of pressure and for formulating reasons. Hydrocarbons are generally flammable and sometimes explosive, and therefore, fluorocarbons are often the preferred propellants. Generally in spray compositions, the propellants will comprise at least 50% of the total aerosol composition; for example, 50 to 70 for residual sprays and 50 to 92 for air sanitizers. When a compressed gas is used in combination, the combination will often comprise at least 20% of the total aerosol composition. When a foamable composition is employed, for example, an aqueous composition containing a soap like potassium fatty acid soap, then the propellant often comprises from 5 to 20% of the composition; e.g., 8 to 12%.

The fluorohydrocarbon propellants are generally chlorinated and fluorinated hydrocarbons and include trichloromonofluoromethane, dichlorodifluoromethane, dichloromonofluoromethane, monochlorodifluoromethane, trichlorotrifluoroethane and dichlorotetrafluoroethane. Of the foregoing mixtures of dichlorodifluoromethane with trichloromonofluoromethane are the preferred propellants.

In addition to the active ingredients and the propellant, my aerosol compositions may also contain varying amounts of other additives which may be admixed in appropriate quantities in the formulating compositions, which additives would include humectants, suspending agents, bases for ointments and lotions, granulating vehicles, soaps, emoluments, bulk carriers, surfactants, etc. While obviously destructive additives would not be added by those skilled in the chemical arts, the stability of the active ingredients cannot be assured unless the formulation is essentially free of anionic substances. For example, nonionic surfactants and compounds and some cationic substances are compatible with the active ingredients so that choices may generally be directed accordingly in selecting the appropriate vehicles. Typically, my formulations may include soaps, such as the sodium, potassium, ammonium and other metal soaps of fatty acids, such as potassium stearates, oleates and the like, and nonionic surfactants, such as, for example, the alkylarylpolyether alcohols, sulfonates and sulfates, such as, for example, the octyl and nonyl phenoxypolyethoxyethanols known by the trade name. Triton, which compounds may have from 10 to 80 polyethoxy groups as desired. Another typical synthetic nonionic low-foaming detergent or surfactant suitable for use with the active ingredients of my invention would include polyoxyethylene derivatives of fatty acids, partial esters of, for example, hexatol anhydrides known in the trade as Tweens. I have found that the formulation known as Tween 20 in amounts ranging from about 1 to 20% by weight in an aqueous composition are effective for dispersing the active ingredients. Typical surfactants that are employed include, for example, 1 to 8% by weight of polyethoxyethylene sorbitan, monopalmitate, monolaureate and other fatty acid and alcohol derivatives. In addition, it is often useful to include in my formulations various chelating agents, particularly in aqueous formulations where the product is to be employed in hard water areas. Typical chelating agents would include ethylene diamine tetracetic acid, and sodium and potassium salts of ethylene polyamines, such as the disodium salt of ethylene diamine tetracetic acid in amounts ranging from about 0.01 to 2.0% of the formulation.

Typical additives employed in both air sanitizing and residual-type sprays for additional disinfectant qualities, as well as to control the humectant and degree of drying characteristics are polyols, such as the alkylene glycols, such as triethylene glycol, dipropylene glycol, propylene glycol, ethylene glycol and the like. Polyols are often employed in amounts ranging from about 0.5 to 12% by weight of the formulation; e.g., 5 to 10. Typically, polyols are employed in those aerosol compositions which contain an alcohol carrier, such as isopropyl alcohol or anhydrous ethyl alcohol, but may also be employed for their emolument and humectant properties in aerosol foamable compositions in combination with various surfactants and soaps. Bases for ointments and lotions containing the active ingredients would include polyethylene glycols and methoxypolyethylene glycols having a molecular weight generally ranging from 200 to 20,000 and identified by the trade name, "Carbowax." Typical granulation vehicles for my ingredients include gelatin, while emoluments include various fatty acids and alcohols, waxes, lanolin, paraffin and the like. Base carriers for my formulation include sugars like lactose, starches and other powdered inert ingredients. Other additives would include oils, perfumes, etc.

Substances particularly effective to allay the inflammation attending infections may desirably be added to my disinfecting compositions, particularly for topical use; for example, on mucous membranes or on skin, to promote healing, while the invading microorganisms are combated by the active ingredients. Steroids, specifically 17 alphahydroxycorticosterone and hydrocortisone and its therapeutically active derivatives are eminently suitable.

In the formulation of disinfectant spray aerosol compositions, water or alcohol or combinations thereof may be employed as desired; however, in air sanitizing-type sprays, typically the formulation would include the active ingredients glycol, alcohol and a propellant formula at the desired pressure and employed with a suitable spray valve opening; for example, 0.010 to 0.025 inch under pressure sealed in an aerosol container.

The specific antimicrobial activity of the relatively common monoterpene citral, consisting of its geometric isomers neral and geranial, against a number of microorganisms including the fungi and bacteria of Table I, is set out in Table II. The separate efficacies of phenol and of citral, indicated by the concentrations of each at which growth is inhibited, establish the phenol coefficient of citral.

When the monoterpene aldehyde citral is admixed with a halide salt of cetyl pyridinium, the specific activity of the admixture in preventing or inhibiting growth of the fungi and bacteria previously tested is shown by Table III to be strikingly and inexplicably enhanced in all instances. In this table are listed the phenol coefficients of cetyl pyridinium bromide alone, of cetyl pyridinium chloride alone, of citral alone, and of the combinations of each halide salt with citral, wherein the citral concentrations respectively are 20 p.p.m. and 10 p.p.m. As will be immediately apparent, the admixture of the two ingredients produces an improvement in antimicrobial activity which in some cases is more than a thousand times that of either constituent alone. This clearly demonstrates that a strong synergistic potentiation is achieved. The antimicrobial potency is far greater than may be accounted for by merely summing the PC factors of the ingredients. That the enhancement is wholly the result of synergistration of antimicrobial activity may be understood from a simple inspection of the data, which shows a PC for the admixture which is a multiple of the aggregate of the separate PC factors. For example, the composition consisting of cetyl pyridinium bromide and citral has a synergized antimicrobial activty against *Candida albicans* wherein the PC factor is more than six times as large as the product of the individual PC factors of the separate constituents, and more than forty-seven times as large as their aggregate.

It will also get apparent that effective concentrations of the composition are low. The substance citral is itself a harmless food substance. The concentration of cetyl pyridinium bromide lethal to resistant microorganisms such as *Staphylococcus aureus* ATCC #11631 in admixture with citral is so low that it might be ingested with complete safety. Tests carried out show that even enormously higher concentrations are relatively safe for animals.

The composition when appropriately formulated is clearly ideally suited to the treatment of infections by microorganisms in animals and man, both on skin surfaces and on mucous membranes.

Monoterpenes chosen from the list given hereinabove when tested for synergism in combination with cetyl pyridinium halide salts, were found to produce excellent improvements of antimicrobial activity, in some instances the enhancement being superior to that obtained by combining citral with the salt. Table IV shows PC factors calculated when a fixed concentration of the monoterpene was admixed with amounts of cetyl pyridinium bromide increasing upwards from 0.0 p.p.m. and added to the culture media inoculated with the fungus Trichoderma sp. 9645, a causative organism for the ailment "athlete's foot."

This fungal microorganism was selected in view of its relatively high resistance to phenol, and because its mode of growth in surface skin layers of the body presents a locate difficult of treatment by reason of absorption of phenol in intact surface tissue.

Table IV shows that whereas cetyl pyridinium bromide has a PC alone of 3.33 (Table III), each of thirteen monoterpene additives chosen at random out of the possible compounds embraced within the class of acyclic, monocyclic and bicyclic monoterpenes and their oxygenated derivatives, produced startlingly effective antiseptics and antifungal compositions with respect to the microorganism. The random test included citronellal, citronellol, eucalyptol, fenchone, geraniol, linalool, menthol, nerol, p-cymene, pinene, pulegone, terpineol, and thymol, representing hydrocarbons, aldehydes, alcohols, ketones, and other oxygenated forms derived from monoterpene hydrocarbons. The PC values obtained ranged from 106.5 to 444, when 20 p.p.m. of the additive were employed.

The following specific formulations and particularly the aerosol formulations are proposed to illustrate rather than to limit the practice of the invention and it will be apparent that ointments, jellies, creams, lotions, sprays, sanitizing and cleansing preparations, paints and waxes, and other forms of sprayable and foamable compositions may be varied extensively from the exact proportions given in the examples. It will be understood that the ingredients specified should be admixed in accordance with approved pharmaceutical techniques when formulated as medications. The formulations not shown in combination with aerosol propellants may be readily adapted to be dispensed in the desired form by an aerosol container by a propellant.

It is moreover advisable to protect compositions from prolonged exposure to light and heat.

EMBODIMENTS OF THE INVENTION

Antiseptic solution:
```
Cetyl pyidinium bromide _____mg__  10
Monoterpene hydrocarbon or oxygenated deriva-
  tives (e.g., citral) _____mg__   5
40% ethyl alcohol _____ml__ 100
```

The solution is protected from light and heat and is used full strength for antifungal and antibacterial control directly on skin and mucous surfaces, wounds, and in disinfecting articles and utensils, or it may be diluted with up to 10 times its volume of water. This composition may be pressurized in an aerosol container having a spray-type sealed valve to 100 to 120 p.s.i.g. with nitrogen gas and dispensed as an aerosol spray.

Lotion:
```
Carbowax 400 _____grams__  45
Propylene glycol _____ml__    15
Cetyl pyridinium bromide _____mg__    10
Citral _____mg__     5
Water, up to 100 ml.
```

This lotion as well as the following lotion and ointment formulation may be pressurized in an aerosol container with a fluorocarbon propellant mixture, such as 50/50 Freon 12/114 to a pressure of 80 to 100 p.s.i.g., employing 6 to 15 weight percent of the propellant mixture and be dispensed as a lotion through a foam-type aerosol valve.

Ointment:                                  Parts
```
Paraffin _____ 40
Lanolin _____ 10
Liquid paraffin _____ 60
Cetyl pyridinium bromide (or cetyl pyridinium
  chloride) _____ 1/60
Citral _____ 1/100
```

Compositions combining the antimicrobial activities of the active ingredients of the invention, with the antipruritic and antiinflammatory properties of hydrocortisone are set out in the following exemplary embodiments.

Lotion:
```
Carbowax 400 _____grams__  45
Propylene glycol _____ml__    15
Cetyl pyridinium bromide _____mg__    10
Citral _____mg__     5
Hydrocortisone _____gram    0.5
Water, up to 100 ml.
```

Ointment:
```
Paraffin _____grams__  40
Lanolin _____do____   10
Liquid paraffin _____do____   60
Lauryl pyridinium chloride _____mg__    20
Citral _____mg__    10
Hydrocortisone _____gram__    1
```

Lotion:
```
Carbowax 400 _____grams__  40
Propylene glycol _____do____  20
Lauryl pyridinium bromide _____do____  15
Thymol _____mg__     7
Water, up to 100 ml.
```

Room surfaces, as in houses, hospitals, and institutions may be sanitized by use of a detergent cleaning compound as indicated below, wherein the ingredients are present in the relative weight proportions indicated.

Detergent sanitizer:                       Percent
```
Nonionic low foaming detergent _____ 10
Cetyl pyridinium bromide _____ 2
Citral _____ 1
Water _____ 87
```

The above composition, diluted with water in the proportion of one pound per 200 to 250 pounds, provides a potent nontoxic antiseptic wash devoid of any objectionable smell. This formulation may be dispensed as a residual aerosol spray by an aerosol propellant.

Water solutions of the detergent sanitizer compound may be prepared in the strength of one pound per 100 pounds water, and applied to textiles, paper webs in paper mills, and printing rollers and blankets, by spraying or atomizing the solution.

When added to tanks in a proportion of from about 50 to about 200 parts per million, the sanitizer preparation above is effective for the control of slime-forming microorganisms and algae. Stronger concentrations are well suited to treatment of foot baths in shower rooms.

Aerosol air sanitizer:                Weight percent
```
Cetyl pyridinium bromide _____ 0.0625
Citral _____ 0.0125
Triethylene glycol _____ 4.0000
Dipropylene glycol _____ 4.0000
Isopropyl alcohol _____ 16.9250
Propellant 50/50 Freon 11/12 _____ 75.0000
                                       ─────────
                                        100.0000
```

Aerosol air sanitizer:
```
Lauryl pyridinium bromide _____ 0.0500
Thymol _____ 0.0100
Propylene glycol _____ 2.0000
Triethylene glycol _____ 3.0000
Anhydrous ethyl alcohol _____ 19.9400
Propellant 50/50 Freon 11/12 _____ 75.0000
                                       ─────────
                                        100.0000
```

Aerosol air sanitizer:
```
Cetyl pyridinium chloride _____ 0.0625
Citral _____ 0.0025
Propylene glycol _____ 2.5000
Triethylene glycol _____ 4.0000
Isopropyl alcohol _____ 8.4350
Propellant _____ 85.0000
                                       ─────────
                                        100.0000
```

Aerosol air sanitizer:
```
Lauryl pyridinium bromide _____ 0.0750
Citral _____ 0.0075
SDA #40 anhydrous ethyl alcohol _____ 0.5000
Hexylene glycol _____ 2.4175
Dichloride fluoromethane propellant
  (Freon 12) _____ 97.0000
                                       ─────────
                                        100.0000
```

The degree of dryness of the air sanitizer formulations is regulated by adjustment in the polyol and alcohol amounts as follows:

| | Percent |
|---|---|
| Triethylene glycol | 0.5–8 |
| Dipropylene glycol | 1.0–8 |
| Alcohol | 8.0–19 |

Residual aerosol formulation:

| | |
|---|---|
| Cetyl pyridinium bromide | 0.0250 |
| Citral | 0.0020 |
| Polyoxyethylene monopalmitate | 0.2000 |
| Disodium salt of ethylene diamine tetracetic acid | 0.0065 |
| Water | 99.7665 |
| | 100.0000 |

The above formulation is sealed in a seamless one-pound tin-plated aerosol container containing an aerosol valve having a surface of 0.015" sealed therein, and the formulation pressurized to 100 to 120 p.s.i.g. with nitrogen gas.

Aerosol hair grooming foam:

| | Weight percent |
|---|---|
| Surfactant—Triton 400 | 3.000 |
| Lauryl pyridinium chloride | 0.500 |
| Citral | 0.025 |
| Purified lanolin-alcohol | 1.300 |
| Polyvinyl pyrilidone | 7.700 |
| Alcohol | 28.675 |
| Water | 58.800 |
| | 100.000 |

Combine the above formula with 15% of a propellant Freon 50/50 F12/F114 mixture in an aerosol container.

The above formulations may also be employed as a feminine hygiene vaginal foam or spray. Such feminine hygiene formulation may include Carbowax 1000 and 4000 as carriers as well as small amounts of hydrocortisone, for example, as above.

Aerosol vaginal foam:

| | |
|---|---|
| Surfactant—Triton 400 | 3.000 |
| Carbowax 4000 | 3.000 |
| Carbowax 1000 | 6.000 |
| Cetyl pyridinium bromide | 0.200 |
| Citral | 0.050 |
| Hydrocortisone | 0.100 |
| Water | 87.650 |
| | 100.000 |

Pressurize with nitrogen to 100 to 125 p.s.i.g.

TABLE I

| | Concentration of— | | | | |
|---|---|---|---|---|---|
| Micro-organism | Phenol for control, p.p.m. | Ceytl pyridinium chloride for control, p.p.m. | PC | Conc. of cetyl pyridinium bromide for control, p.p.m. | PC |
| Trichoderma sp. ATCC 9645 | 666 | >200 | <3.3 | 200 | 3.30 |
| Tricophyton mentagrophytes TACC 9533 | 2,000 | 25 | 80 | 6.25 | 320 |
| Microsporum gypseum ATCC 10215 | 400 | >100 | <4 | | |
| Tricophyton mentagrophytes ATCC 11480 | 533 | 12.5 | 42.6 | 6.25 | 85.3 |
| Tritirachium purpureum ATCC 11385 | 666 | | | 100 | 6.66 |
| Microsporum audouni ATCC 11347 | 400 | | | 1.56 | 256.4 |
| Tricophyton tonsurans ATCC 10217 | 400 | | | 0.78 | 512.8 |
| Candida albicans | 4,000 | | | 200 | 20 |
| Staphylococcus aureus ATCC 6538 p-4 | 4,000 | | | 3.12 | 1,282 |
| Staphylococcus aureus ATCC 11631 | 4,000 | | | 50 | 80 |
| Proteus vulgaris ATCC 6380 | 4,000 | | | 900 | 4.4 |
| Shigella dysenteriae ATCC 11835 | 2,000 | | | 12.5 | 160 |
| Salmonella typhosa ATCC 6539 | 2,000 | | | 50 | 40 |
| Diplococcus pneumoniae ATCC 6303 | 1,000 | | | 12.5 | 80 |

P.p.m.: parts per million.
PC: phenol coefficient.

TABLE II

| | Concentration of— | | |
|---|---|---|---|
| Micro-organism | Phenol for control, p.p.m. | Citral (Neral and Geranial) for control, p.p.m. | PC of mixture |
| Trichoderma sp. ATCC 9645 | 666 | 333 | 2.0 |
| Tricophyton mentagrophytes ATCC 9533 | 2,000 | 333 | 6.0 |
| Microsporum gypseum ATCC 10215 | 400 | | |
| Tricophyton mentagrophytes ATCC 11480 | 533 | 83 | 6.42 |
| Tritirachium purpureum ATCC 11385 | 666 | 83 | 8.02 |
| Microsporum audouni ATCC 11347 | 400 | 20.8 | 19.61 |
| Tricophyton tonsurans ATCC 10217 | 400 | 20.8 | 19.61 |
| Candida albicans | 4,000 | 333 | 12.0 |
| Staphylococcus aureus ATCC 11631 | 4,000 | 666 | 6.0 |
| Staphylococcus aureus ATCC 6538 p-4 | 4,000 | 333 | 12.0 |
| Proteus vulgaris ATCC 6380 | 4,000 | 666 | 6.0 |
| Shigella dysenteriae ATCC 11835 | 2,000 | 666 | 3.0 |
| Salmonella typhosa ATCC 6539 | 2,000 | 666 | 3.0 |
| Diplococcus pneumoniae ATCC 6303 | 1,000 | 333 | 3.0 |

TABLE III

| | Conc. of cetyl pyridinium chloride for control, when 20 p.p.m. terpene present (citral) | PC of mixture | Concentration of cetyl pyridinium bromide for control, when 10, 20 p.p.m. terpene present (citral) | | PC of mixtures | PC of CPB alone | PC of citral alone |
|---|---|---|---|---|---|---|---|
| | | | 10 p.p.m. | 20 p.p.m. | | | |
| Trichoderma sp. ATCC 9645 | 25 | 26.6 | 100 | 25 | 6.66 | 26.6 | 3.33 | 2.0 |
| Trichopyton mentagrophytes ATCC 95333 | 1.56 | 1,282 | 1.55 | 0.78 | 1,282 | 2,564 | 320 | 6.0 |
| Microsporum gypseum ATCC 10215 | 25 | 16 | 12.5 | 6.25 | 32 | 64 | | 9.6 |
| Tricophyton mentagrophytes ATCC 11480 | | | 0.38 | 0.38 | 1,366 | 1,366 | 85.2 | 6.4 |
| Microsporum audouni ATCC 11347 | | | 3.12 | 0.39 | 128.2 | 1,025 | 256.4 | 19.61 |
| Candida albicans | | | 12.5 | 3.12 | 320 | 1,282 | 20 | 12.0 |
| Staphylococcus aureus ATCC 11631 | | | a 6.25 | b 3.12 | 640 | 1,280 | 80 | 6.0 |
| Shigella dysenteriae ATCC 11835 | | | 12.5 | 12.5 | 160 | 160 | 160 | 3.0 | a 50 p.p.m. citral.
b 100 p.p.m. citral.

TABLE IV

Fungal micro-organism: Trichoderma sp. ATCC #9645; phenol coefficient for cetyl pyridinium bromide: 3.3

| Monoterpene additive in culture, 20 p.p.m. of each | Days elapsed to commencement of growth in culture containing cetyl pyridinium bromide in concentration given | | | | | | PC for composition |
|---|---|---|---|---|---|---|---|
| | 6.25 p.p.m. | 3.15 p.p.m. | 1.5 p.p.m. | 0.78 p.p.m. | 0.36 p.p.m. | 0.0 p.p.m. | |
| Citronellal | — | — | — | 10 | 10 | 3 | 444 |
| Citronellol | — | 5 | 5 | 5 | 4 | 3 | 106.5 |
| Eucalyptol | — | 5 | 5 | 5 | 55 | 3 | 106.5 |
| Fenchone | — | — | — | 3 | 3 | 3 | 444 |
| Geraniol | — | — | — | 3 | 33 | 3 | 444 |
| Linalool | — | — | — | 3 | 3 | 3 | 444 |
| Menthol | — | — | 7 | 5 | 5 | 3 | 211.4 |
| Nerol | — | — | — | 6 | 3 | 3 | 444 |
| p-Cymene | — | — | 3 | 3 | 3 | 3 | 211.4 |
| Pinene | — | — | — | 5 | 3 | 3 | 444 |
| Pulegone | — | — | — | 5 | 3 | 3 | 444 |
| Terpineol | — | — | 5 | 5 | 3 | 3 | 211.4 |
| Thymol | — | — | — | 7 | 3 | 3 | 444 |

—: Denotes no observable growth in 15 days.

Many other applications and modes of use will suggest themselves to one skilled in the art, and the practice of the invention is extended to every such application, vehicle, and mode of use without restriction, except as set out hereinafter by the appended claims.

What is claimed is:

1. A disinfectant aerosol which comprises an aerosol container and means to dispense under pressure the contents of the container, the contents comprising an effective amount of a liquified gaseous aerosol propellant, and a bacteriostatically and fungistatically effective amount of a composition consisting essentially of as active ingredients, a halide salt of cetyl pyridinium and a monoterpene selected from the group of isoprenoid compounds consisting of the monocyclic, bicyclic and acyclic monoterpene hydrocarbons and their alcohol, aldehyde, ketone, acid, ether and other oxygenated derivatives, which contain the repeating isoprene structural pattern and are represented by the formulas $C_{10}H_{16}$, $C_{10}H_{16}O$, $C_{10}H_{18}O$, $C_{10}H_{14}$, $C_{10}H_{14}O$, $C_{10}H_{14}O_2$, $C_{10}H_{20}O$, and $C_{10}H_{20}O \cdot H_2O$, the weight of the active ingredients having a ratio of between about 1:50 and 50:1; and a carrier selected from the group consisting of water, alcohol, and mixtures thereof for the active ingredients whereby the propellant provides for the dispensation from the aerosol container of the active ingredients and carrier.

2. The product of claim 1 wherein the monoterpene is selected from the group consisting of citronellal, citronellol, eucalyptol, fenchone, geraniol, linalool, menthol, nerol, p-cymene, pinene, pulegone, terpineol, thymol and citral.

3. The product of claim 1 wherein the active ingredients comprise cetyl pyridinium bromide and citral.

4. The product of claim 1 which includes from about 0.5 to 12.0% by weight of an alkylene glycol selected from the group consisting of triethylene glycol, dipropylene glycol, propylene glycol, ethylene glycol and hexylene glycol.

5. The product of claim 1 which includes hydrocortisone.

6. The product of claim 1 which includes a polyoxyethylene derivative of a fatty acid low foaming nonionic detergent.

7. The product of claim 1 which includes water as a carrier and which contains a chelating agent selected from the group consisting of ethylene diaminetetraacetic acid and the sodium and potassium salts thereof.

8. The product of claim 1, wherein the carrier includes an aliphatic monohydric alcohol containing two to three carbon atoms.

9. The product of claim 1 wherein the means to dispense the product is a spray-type valve, whereby the product is dispensed in spray form.

10. The product of claim 1 wherein the means to dispense the product is a foam dispensing-type valve whereby the product is dispensed in a foam form.

11. A disinfectant aerosol spray product which comprises an aerosol container which includes a valve to dispense the contents of the container in spray form, the container having therein:
 (a) a liquified gaseous aerosol propellant;
 (b) an alcohol carrier;
 (c) an alkylene glycol; and
 (d) a bacteriostatically and fungistatically effective amount of a composition consisting essentially of active ingredients citral and a halide salt of cetyl pyridinium selected from the group consisting of the chloride and bromide salts, the weights of said active ingredients having a ratio between about 1:50 and 50:1.

References Cited

UNITED STATES PATENTS

| | | | |
|---|---|---|---|
| 3,287,214 | 11/1966 | Taylor et al. | 424—45 |
| 3,131,153 | 4/1964 | Klausner | 252—305 |
| 3,595,975 | 7/1971 | Gauvreau | 424—263 |

OTHER REFERENCES

Merck Index, 7th ed., 1960, p. 227.
Merck Index, 7th ed., 1960, p. 130.
Chemical Abstract, 47:10618i (1953).
Chemical Abstract, 49:11091f (1955).
"Modern Drugs," 8th ed., 1961, p. 1037.

ALBERT T. MEYERS, Primary Examiner

L. SCHENKMAN, Assistant Examiner

U.S. Cl. X.R.

424—263, 331, 333, 346, 356